United States Patent
Furtwangler

(10) Patent No.: US 10,257,579 B2
(45) Date of Patent: Apr. 9, 2019

(54) PROVIDING RESPONSIVE VIDEO PREVIEWS DURING REWIND AND FAST FORWARD

(71) Applicant: Home Box Office, Inc., New York, NY (US)

(72) Inventor: Brandon C. Furtwangler, Woodinville, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

(21) Appl. No.: 15/863,423

(22) Filed: Jan. 5, 2018

(65) Prior Publication Data

US 2018/0132008 A1     May 10, 2018

Related U.S. Application Data

(63) Continuation of application No. 14/011,083, filed on Aug. 27, 2013, now abandoned.

(51) Int. Cl.
| | |
|---|---|
| *H04N 21/472* | (2011.01) |
| *G11B 27/30* | (2006.01) |
| *G11B 27/34* | (2006.01) |
| *H04N 21/845* | (2011.01) |
| *H04N 21/2387* | (2011.01) |
| *H04N 21/432* | (2011.01) |
| *H04N 21/442* | (2011.01) |

(Continued)

(52) U.S. Cl.
CPC ... *H04N 21/47217* (2013.01); *G11B 27/3081* (2013.01); *G11B 27/34* (2013.01); *H04N 21/2387* (2013.01); *H04N 21/4325* (2013.01); *H04N 21/44209* (2013.01); *H04N 21/4621* (2013.01); *H04N 21/47202* (2013.01); *H04N 21/6587* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 5,260,868 A | 11/1993 | Gupta et al. | |
| 5,659,539 A * | 8/1997 | Porter | G11B 27/031 |
| | | | 348/E7.073 |

(Continued)

FOREIGN PATENT DOCUMENTS

| | | | |
|---|---|---|---|
| WO | 2012003237 A1 | 1/2012 | |
| WO | WO 2012003237 A1 * | 1/2012 | ......... H04N 21/6587 |

OTHER PUBLICATIONS

Office Action for U.S. Appl. No. 14/011,083 dated Jan. 27, 2015, 26 pages.

(Continued)

*Primary Examiner* — Jason K Lin
(74) *Attorney, Agent, or Firm* — Amin, Turocy & Watson, LLP

(57) ABSTRACT

The subject disclosure is directed towards on-demand downloading of trickplay images during fast forwarding or rewinding of streaming video. A next trickplay image is selected and downloaded based upon the fast forward or rewind rate and the current location in the video. To ensure sufficient download time, the trickplay image may be chosen with a specified quality/resolution based upon historical timing data (e.g., a running average) to adaptively adjust to network bandwidth changes.

20 Claims, 6 Drawing Sheets

(51) Int. Cl.
*H04N 21/462* (2011.01)
*H04N 21/6587* (2011.01)

(56) References Cited

U.S. PATENT DOCUMENTS

| | | | |
|---|---|---|---|
| 5,754,773 | A | 5/1998 | Ozden et al. |
| 6,065,050 | A | 5/2000 | DeMoney |
| 6,327,421 | B1 | 12/2001 | Tiwari et al. |
| 6,871,006 | B1 | 3/2005 | Oguz et al. |
| 2002/0116286 | A1 | 8/2002 | Walker et al. |
| 2008/0090513 | A1 | 4/2008 | Collins et al. |
| 2009/0158326 | A1 | 6/2009 | Hunt et al. |
| 2009/0168903 | A1 | 7/2009 | Vaquero et al. |
| 2009/0328124 | A1 | 12/2009 | Khouzam et al. |
| 2010/0003008 | A1 | 1/2010 | Thomas et al. |
| 2010/0064054 | A1 | 3/2010 | Karlsson et al. |
| 2010/0146145 | A1 | 6/2010 | Tippin et al. |
| 2011/0116772 | A1 | 5/2011 | Kwon et al. |
| 2011/0145856 | A1 | 6/2011 | Agarwal et al. |
| 2011/0293252 | A1* | 12/2011 | Greenfield ............. H04N 5/783 386/345 |
| 2012/0311094 | A1* | 12/2012 | Biderman ............. H04N 5/783 709/219 |
| 2013/0263179 | A1 | 10/2013 | Dow et al. |
| 2014/0380347 | A1 | 12/2014 | Naveh et al. |
| 2018/0019001 | A1* | 1/2018 | Van Stam ............. H04N 5/781 |

OTHER PUBLICATIONS

"International Search Report", dated May 3, 2015 Application No. PCT/US14/51813 pp. 1-5.
Office Action for U.S. Appl. No. 14/011,083 dated Sep. 8, 2015, 38 pages.
Colombian Office Action and General English Translation for CO Application Serial No. 16-066.272, dated Apr. 19, 2016, 7 pages.
Office Action for U.S. Appl. No. 14/011,083 dated Nov. 17, 2016, 121 pages.
Office Action for U.S. Appl. No. 14/011,083 dated Mar. 30, 2017, 47 pages.
Office Action for U.S. Appl. No. 14/011,083 dated Sep. 12, 2017, 56 pages.
Office Action for U.S. Appl. No. 14/011,083 dated Jun. 3, 2016, 45 pages.

\* cited by examiner

PROVIDING RESPONSIVE VIDEO PREVIEWS DURING REWIND AND FAST FORWARD

CROSS REFERENCE TO RELATED APPLICATIONS

This application is a continuation of pending U.S. patent application Ser. No. 14/011,083 filed on Aug. 27, 2013, entitled "PROVIDING RESPONSIVE VIDEO PREVIEWS DURING REWIND AND FAST FORWARD." The entirety of the aforementioned application is hereby incorporated herein by reference.

BACKGROUND

When a user interacts to rewind (RW) or fast forward (FF) a video, some guidance generally needs to be given to the user as to the place that the user is within the video. In this way, the user can find a desired place to begin or resume playing the video. Showing a moving location pointer relative to a timeline or the like is one form of guidance; however, showing representative images provides additional context to help the user decide whether to continue the RW/FF operation as is, or further interact (e.g., speed up or slow down the RW/FF operation, or switch to play).

In recorded video such as on a DVD, the I-frames ("Intra-coded" frames) are already present and serve as a good source of representative location-related images to present to the user. In streaming video provided by video delivery services, another solution is needed, in part because the video cannot be downloaded and/or decoded fast enough to keep up with faster RW/FF operating rates.

One way streaming video services provide such location guidance is to use what is often referred to as "trickplay," in which the user is occasionally shown a representative "trickplay" image that is fixed (rather than decoded from the video as needed, which is often too slow). The image is taken from a separate set of images, such as assembled into an accompanying file or set of files downloaded to the user.

One streaming video trickplay solution pre-downloads evenly spaced images taken from the source video, with the images typically placed into a single file. However, this solution has drawbacks, primarily because the file download time is relatively large, and trickplay cannot begin until the file is downloaded. To keep the download time tolerable, the image spacing is typically coarse to reduce the number of images, and the quality/resolution of the trickplay images is kept low. To disguise this fact, during trickplay the images that are shown are typically smaller than full screen, e.g., thumbnail images. Significant memory is also consumed to store the images.

Another solution is similar, but prioritizes trickplay images so that images deemed "higher priority" are first downloaded, with such images coarsely spaced in time. Then, to provide finer temporal detail, lesser priority images between those coarsely-spaced images are downloaded thereafter. Again, because a lot of image data still needs to be downloaded, the quality/resolution of the trickplay images is kept low, and a lot of memory is consumed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards determining a trickplay image to download based upon a fast forward or rewind rate. After downloading the trickplay image, the trickplay image is presented during the fast forward or rewind operation. In one aspect, while presenting the trickplay image, the next trickplay image to download is determined and downloaded based upon a fast forward or rewind rate. In one or more aspects, the trickplay image to download is further selected the image based upon quality, which may be based upon historical timing data.

In one or more aspects, trickplay logic is configured to select a trickplay image from among a set of trickplay images corresponding to streaming video content maintained at a server. The selection is based upon a fast forward or rewind rate and an estimated download time.

One or more aspects are directed towards entering a trickplay mode during a rewind or fast forward operation with respect to streaming video. A trickplay image is selected based at least in part upon a current rewind or fast forward rate, is downloaded from a remote source, and presented. The process repeats by selecting next images at a presentation rate until the trickplay mode is exited.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards downloading, on demand during trickplay mode (while fast forwarding or rewinding), only the trickplay image that is needed for the next location-representative image shown to the user. In one implementation, while one trickplay image is being shown, the next trickplay image is determined and downloaded based upon the current rate of fast forward or rewind. To handle possibly variable round-trip times such as due to bandwidth and/or latency, (along with client-side processing time), the resolution/quality of the next image is also selectable before downloading, such as based upon historical data, e.g., past download time data such as a running average.

As one result, only trickplay images that are actually needed for showing are downloaded, rather than a full set of images as in prior solutions (many of which are likely never used for a given user session). This saves memory, and also means that there is no significant delay, unlike prior solutions that need to download many images in a file before trickplay can begin. Further, full resolution, high-quality images are used whenever available, whereby full screen presentation of the trickplay image is available.

It should be understood that any of the examples herein are non-limiting. For instance, while the technology is described with respect to streamed video, other video technologies may similarly benefit. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and rendering content in general.

Figure 1:
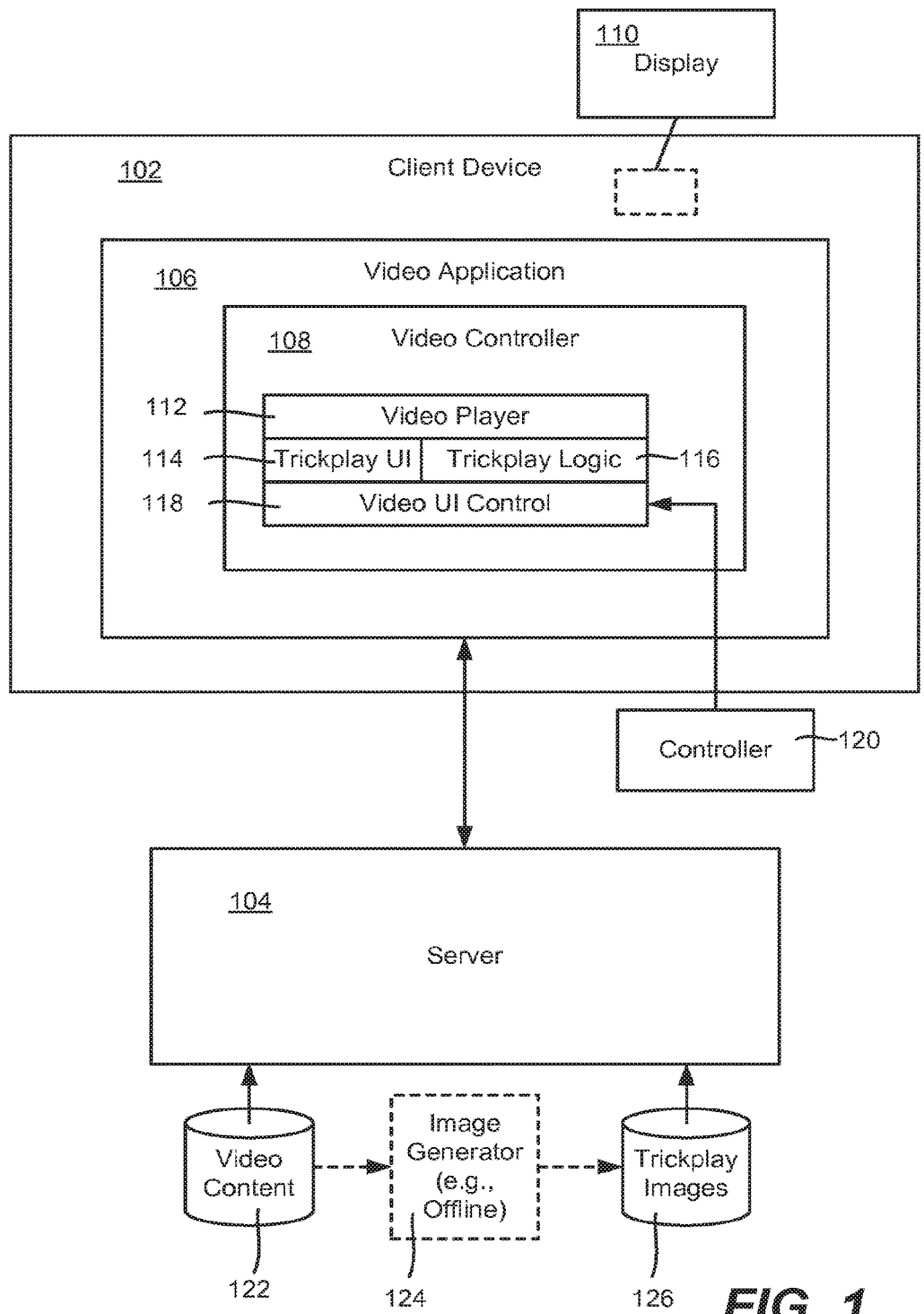
FIG. 1 is a block diagram showing an example configuration that may be used to select and present trickplay images downloaded on demand, according to one or more example embodiments.

FIG. 1 is a block diagram of one example implementation, in which a client device 102 receives streamed video from a video content server 104 or the like. The exemplified client device 102 includes a video application 106, including a video controller 108. The client device 102 has an associated display 110, which may comprise an internal display mechanism and/or an external display mechanism 110. Example client devices include game/entertainment consoles, set-top boxes, personal computers, laptop computers, tablet computers, smartphones and so forth.

The example video controller 108 includes a video player component 112 that in general handles playing of the video during play mode. Trickplay is handled by a trickplay user interface 114 that, among other aspects, shows trickplay images as directed by trickplay logic 116. As is typical, the user interacts with a video UI control component to control the play mode, fast forward and rewind operations, and other operations via a controller 120. The controller may comprise interactive mechanical and/or virtual buttons/controls on the device, a dedicated remote controller, a separate device such as a smartphone or tablet, a game controller, a pointing device, a keyboard, and/or the like. Voice and/or gesture detection also may be used to control device operation, for example.

The server 104 serves video content 122 to the video application 106. This may be accomplished via any suitable streaming/compression technology or technologies.

In an offline operation in advance of any video content serving, an image generator 124 generates a set of trickplay images 126 for each piece of video content (e.g., movie) that is to be streamed. For example, in one implementation exemplified herein, a high resolution, medium resolution and low resolution image is captured/sampled for each one second of video. Note that these sample trickplay images may be fully decoded when captured and need not correspond to I-frames; the images may be compressed in any way (in addition to the quality-based compression). Some manual operation may be involved in choosing sample images, e.g., an entirely (or mostly) black frame may be replaced with another image around that same frame so that a more contextual image is presented to the user instead of the black image that would otherwise appear at that one-second time division/interval. Further, instead of compressing in advance, a server, if sufficiently fast, may maintain a high resolution image and compress on demand, for example.

In general, when the user enters trickplay mode, a certain rate of fast forward or rewind is operational relative to the normal playback/real clock time. For example, the user may interact to cause a fast forward or rewind rate of 2×, 4×, 8× and so on, e.g., up to rates such as 256×. Note that there is no requirement that fast forward or rewind rates are limited to powers of two, however that is a typical implementation. In a typical scenario, a user is able to speed up the rate by pressing (or holding) the FF or RW button; a user slows down fast forward or rewind by pressing the button of the opposite direction, e.g., the RW button or FF button, respectively. A user may enter play mode by pressing the "Play" button at any time. A user also may enter play mode by pressing the opposite button when at the slowest fast forward or rewind rate, e.g., if a user presses RW when fast forwarding at the slowest (e.g., 2×) rate, the rate "lowers" to 1×, which is actually play. As can be readily appreciated, these are only example rates and operational rules, and other rates and/or rules may apply (e.g., in some systems a user may pause and perform other operations, such as jump in half-hour intervals, via other interactions). As will be understood, such other scenarios are consistent with the technology described herein and straightforward to implement.

Figure 2A:
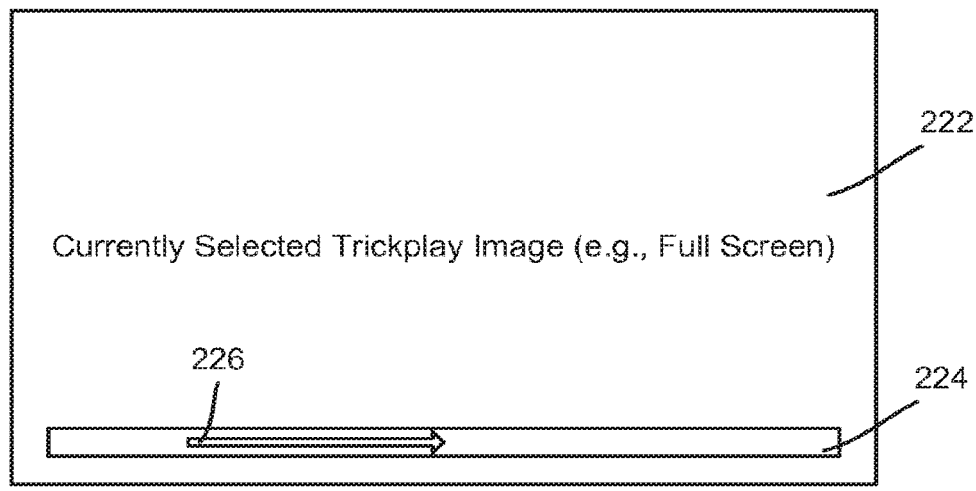
FIGS. 2A and 2B are representations of trickplay images, such as displayed as full screen images, based upon selection of a server image (FIG. 2B), according to one or more example embodiments.

As described above and represented in FIGS. 2A and 2B, at any time during trickplay mode, the user is presented with a current trickplay image 222 (e.g., in full screen) that is selected by the trickplay logic 116 (FIG. 1). In this example, a timeline 224 is superimposed above the image 222, which shows (e.g., via the arrow 266 or other mechanism such as colored shading) the location in the video where the user began trickplay relative to the total video time (e.g., the start of the arrow) and where the user is currently positioned (e.g., the end of the arrow). If an arrow is used, the arrow direction conveys fast forward by pointing and expanding rightwards as in this example, or conveys rewind by pointing and expanding leftwards. As can be readily appreciated, such a timeline/location indicator is not needed but helpful to users, and if used, various other such timeline-based mechanisms are similarly feasible.

Figure 2B:
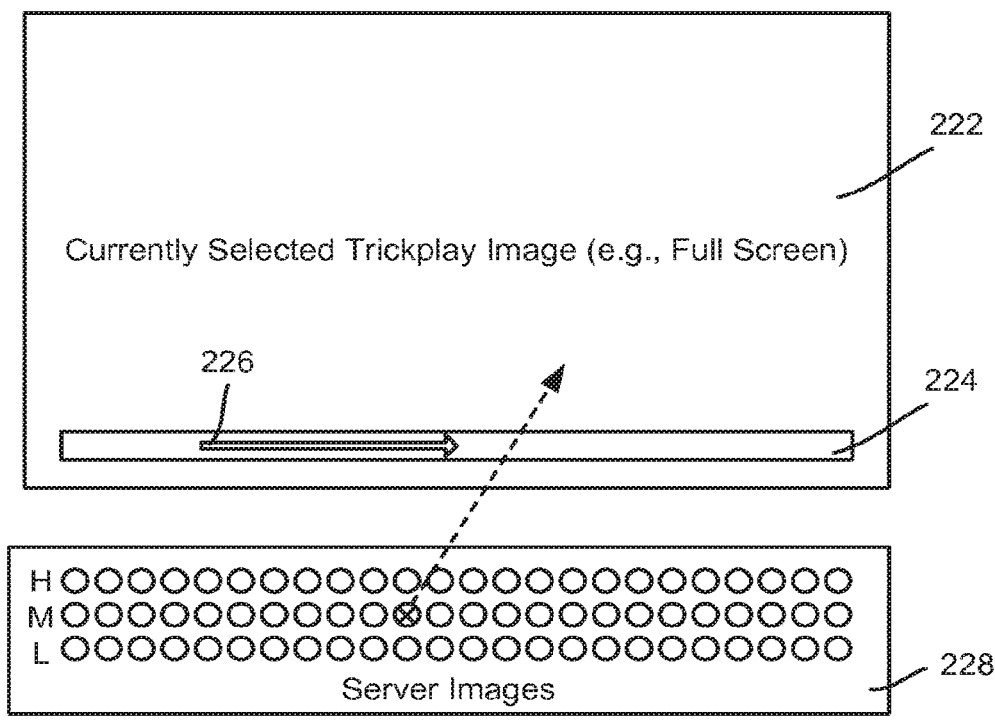

In the example of FIG. 2B, one of the server images (shown via the crossed "X" circle) is the currently selected trickplay image among the available server images 228. In this example, there are twenty-four subsets of (high H, medium M and low L) trickplay images, one subset per second, from which the trickplay logic 116 selects one, based upon the user's current position in the video. The resolution within each subset may be predetermined for selective downloading based upon the time available for downloading, as described herein. In a lengthier video scenario such as a ninety-minute movie, there may, for example, be one subset of H, M and L trickplay images available on the server per each second of video, e.g., on the order of 5,400 subsets of H, M, L trickplay images. Note that one second samples and H, M and L resolutions are only one example implementation, and another other sampling time divisions (not necessarily evenly temporally spaced) and resolution schemes (not necessarily the same options at each sampling interval) may be used in a given implementation.

Figure 3:
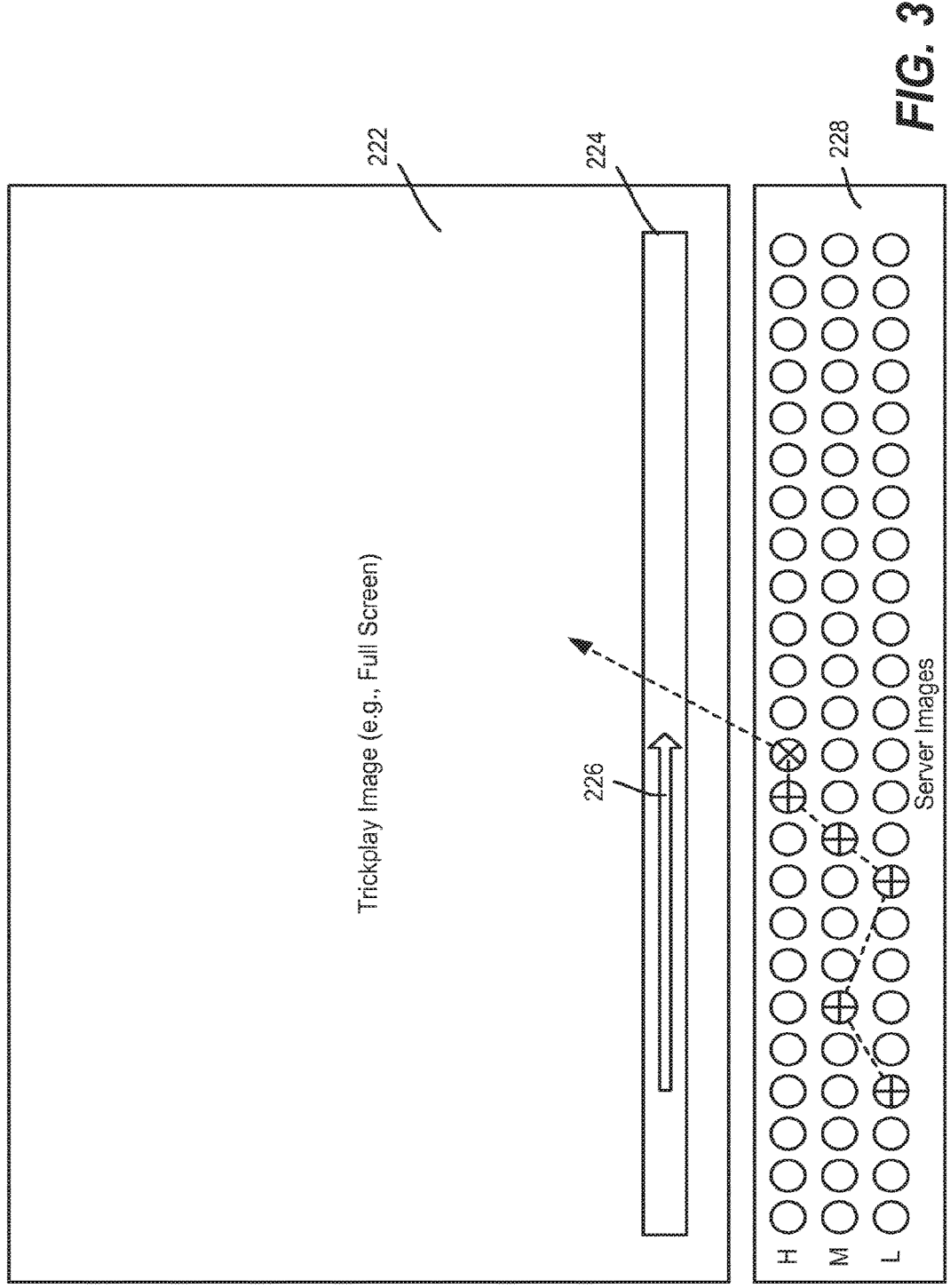
FIG. 3 is a representation of how trickplay images may be selected and presented over time, including skipping over images (or time-divided subsets thereof), according to one or more example embodiments.

FIG. 3 is a general example of how trickplay images may be selected over time. In this example, a first trickplay image is selected from the set of available server images based upon the user location when trickplay mode begins, and the rewind or fast-forward rate. As this trickplay image is displayed, the next one is determined and selected as described herein, as can be followed by the path of circles with crossed "+" images before the selected crossed "X" image. Note that some images may be skipped, as the rate determines how many images to skip. For example, if the user is operating at 16X and there is one (H. M, L subset of) trickplay image per second, then the next selected image may be sixteen images (subsets) forward (if fast forwarding) or backward (if rewinding) if showing the user one image per second. Any suitable identification scheme may be used to request the appropriate image from the server, e.g., [VideoID, timestamp, resolution] may be provided.

As described herein, the resolution of the time-selected image may vary. This is to ensure that the next image downloads in sufficient time for presentation, e.g., within one second if showing one image per second (however faster trickplay presentation rates may be used).

More particularly, generally, the highest possible resolution is desired and used when possible. However, there may be a tradeoff made between resolution and the number of trickplay images shown per second. For example, at 16×, instead of skipping forward or backward sixteen images and showing that corresponding image for one second, the logic may skip forward or backward eight images for a half-second, or four images for a quarter second, and so on. Note that the frame rate of video may be considered, e.g., at thirty-frames per second, there are only thirty frames (images) that can be shown, and thus at rates at or over 32×, some images some need to be skipped if there is only one image per second available at the server, regardless of bandwidth. Further, what looks to be smooth, sped-up video at one rate may not work well at another rate; for example, at 256×, showing thirty different images per second (assuming sufficient bandwidth) may appear too jerky in many scenarios; showing less images each for a longer time (e.g., every 256th image each for a full second, or every 128th image each shown for a half-second) may be more visually pleasing. Note that any of these variables may be user configurable.

Turning to resolution aspects, to determine which resolution to request, the trickplay logic maintains historical timing data, such as a running average or other statistical measure of download time taken (which factors in bandwidth and includes latency). Client-side processing (e.g., decoding) time may be included, which may vary based upon resolution. Thus, the historical timing data may factor in the actual time taken to select, request, download and decode (decompress) the image data. By using a running average or the like, the system adapts to actual network conditions as they change, e.g., as bandwidth increases or decreases. Note that initially, bandwidth or the like/an initial running average may be estimated from other communications, including any previous historic trickplay data (particularly if recent), or the logic may start optimistically (assume sufficient bandwidth for high quality and see if the next image download in time) or pessimistically (assume lowest quality and improve if possible). The running average may be weighted so that more recent downloads are given more weight than older downloads.

The historical data may be maintained as a whole and used to compute an estimate based upon knowledge of approximately how large each image is at each resolution. Alternatively, a set of historical data may be maintained per resolution, e.g., a running average for high, medium or low. Note that images are typically compressed, whereby the images in a subset sample for a given time have approximately the same compression ratio. Further note that the server may provide size metadata in advance, e.g., it takes very little additional information when providing an image to specify the sizes/approximate sizes for the next possible sets of images that the logic may request.

Figure 4:
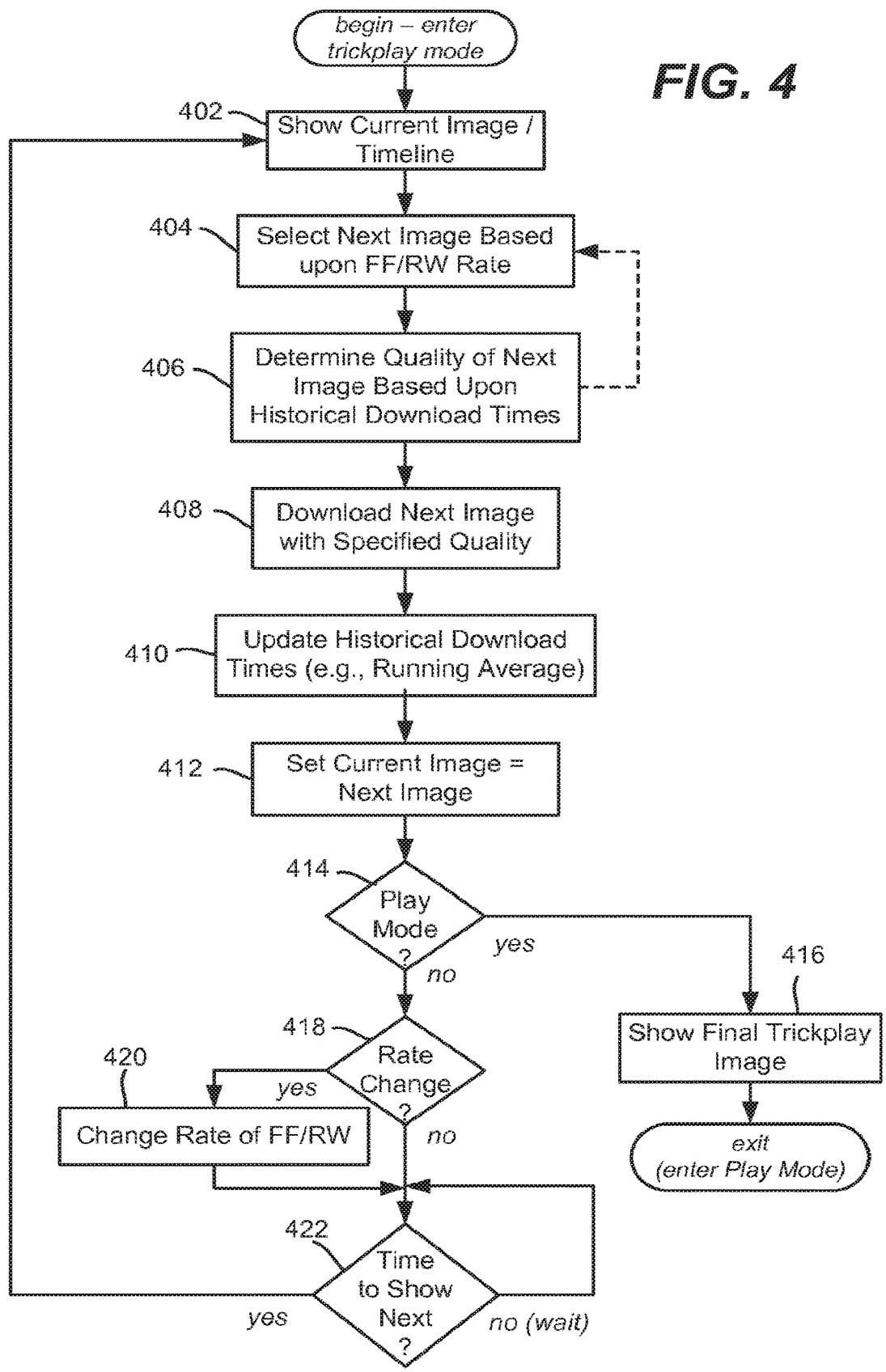
FIG. 4 is a flow diagram showing example steps that may be taken to select, download and present trickplay images based upon fast forward or rewind rate and historical timing data, according to one or more example embodiments.

FIG. 4 shows example steps that may be taken by trickplay logic, beginning at step 402 once the trickplay mode is entered, and the current image (e.g., the current frame from the actual video) is displayed and the timeline updated. Note that trickplay mode need not be used at rates in which the streaming and decoding can keep up with the fast-forward or rewind rate. Further note that the steps of FIG. 4 are only examples, and that not all exemplified steps need be performed and/or other steps may be present, and that the orders of some of the steps may be varied; some exemplified steps also may be performed in parallel, at least to an extent.

Step 404 represents determining the next image to show based upon the fast forward (FF) or rewind (RW) rate. As described above, if the server is storing one image per second, this may be as straightforward as advancing (FF)/retreating (RW) by the rate (multiplier) divided by the number of images per second to show at that rate, e.g., at 16X, select the image that is sixteen divided by the number of desired images to show per second (up to thirty).

Step 406 represents the quality selection for that next image based upon the historical download time data. Note that as represented by the dashed arrow, step 406 may return to step 404, or be performed before as part of step 404 so that, for example, there is not sufficient time to download and process the next requested image at the presentation rate requested by step 404.

Step 408 downloads the next image with the specified quality. When the requested image is received, the historical time data is updated at step 410, e.g., to keep the running average up to date. Note that the updating of the time data may occur after decoding the image, so as to include any decoding time. Step 412 sets the current image to be the next image, for the next display update.

Step 414 evaluates whether the user has interacted to enter the play mode, e.g., by hitting the Play button, or slowing down (by hitting the opposite direction key) to 1×. Note that if trickplay mode is not used at lower rates (because the video can be processed quickly enough), this is considered play mode, and thus some other rate, such as 2×, may be considered play mode at step 414; ("pause" may also enter play mode). If play mode is entered, step 416 shows a final trickplay image, which gives the user a contextual starting point while the system adjusts to stream video from the modified location, e.g., performs seek and buffering operations. Note that instead of the "next" image, a different image may be selected and downloaded as part of step 416 as the final trickplay image for this mode instance, e.g., using heuristics to determine a location in the video and corresponding trickplay image that factors in user reaction time. For example, when the user sees a particular image, the user may hit Play hoping to start at that point, but (particularly at higher rates) the system will move too far relative to the user's reaction time; the selected image and video starting point may be adjusted at step 416 to compensate based upon the rate and typical user reaction times.

If play mode is not entered, the user may have interacted in a way that changed the rate, as detected by step 418. If so, step 420 changes the rate, which will affect the next image selected, including quality considerations. Step 422 represents delaying until the next image is to be shown as the current image. At such a time, step 4722 loops back to show the current image and update the timeline. Note that other user interaction (e.g., exit the program, pause, skip forward or backward by a fixed time interval and so on) are not shown for purposes of brevity; skipping may be easily handled by simply moving forward or backward a corresponding number of trickplay images, e.g., 1,800 image subsets (e.g., H, M, L triplets) for a half-hour if one image subset is stored per second.

Although not needed in many scenarios, some buffering may be used during trickplay. For example, if bandwidth is available, an anticipated "second next" image may begin downloading, and so on, at least in part. Occasionally the user may change the rate or enter the play mode, in which event such an anticipated next image is discarded, however some buffering may be beneficial, such as in environments where the bandwidth is highly variable. Further, consider that buffering may allow an average quality increase, e.g., every other image may alternate between better and lesser quality. For example, if there is not quite enough time for downloading a high-resolution image, but more than enough for time for medium resolution, the extra time when downloading a medium resolution image may be used along with buffering to (at least occasionally) allow for downloading an anticipated next high-resolution image in time.

Figure 5:
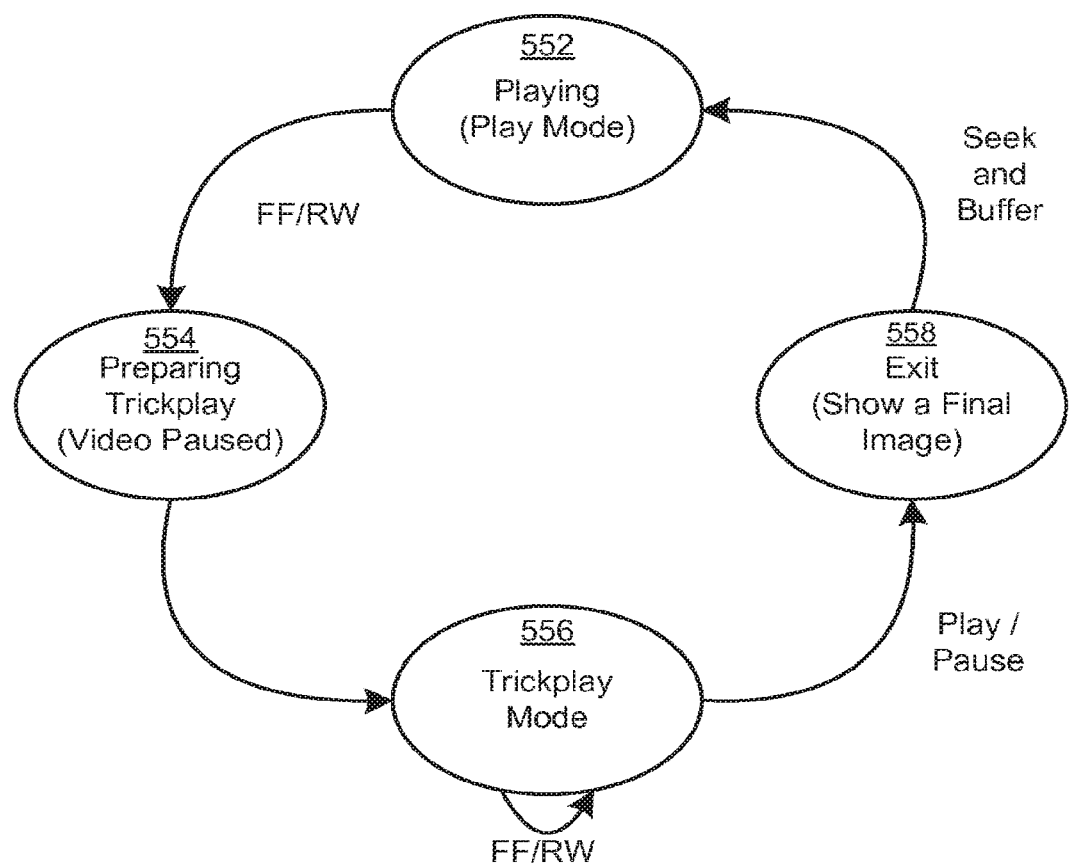
FIG. 5 is a state diagram showing states and transition information, including a playing state and a trickplay state, according to one or more example embodiments.

FIG. 5 is a state diagram showing example states and transition-related information. When in play mode (state 552), a fast forward or rewind command that causes trickplay to be entered transitions to a state 554 for preparing trickplay. In this state, the video is paused so that the user sees the last frame, and any initialization is performed, such as setting up the historical timing data, computing the next trickplay image to show, and requesting that image from the server.

State 556 represents the trickplay mode of operation, which is maintained as long as fast forward or rewind (e.g., at a sufficient rate as described herein) is occurring. This includes any rate changes, and, for example, may include skipping by fixed time intervals. As described above, when an exit state 558 is reached, such as via play or pause, a final image is shown, which may be heuristically or otherwise determined. This allows the system to seek and buffer to the appropriate position in the video before resuming play mode.

Example Computing Device

The techniques described herein can be applied to any device or set of devices capable of running programs and processes. It can be understood, therefore, that handheld, portable and other computing devices and computing objects of all kinds including cell phones, tablet/slate computers, gaming/entertainment consoles and the like are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
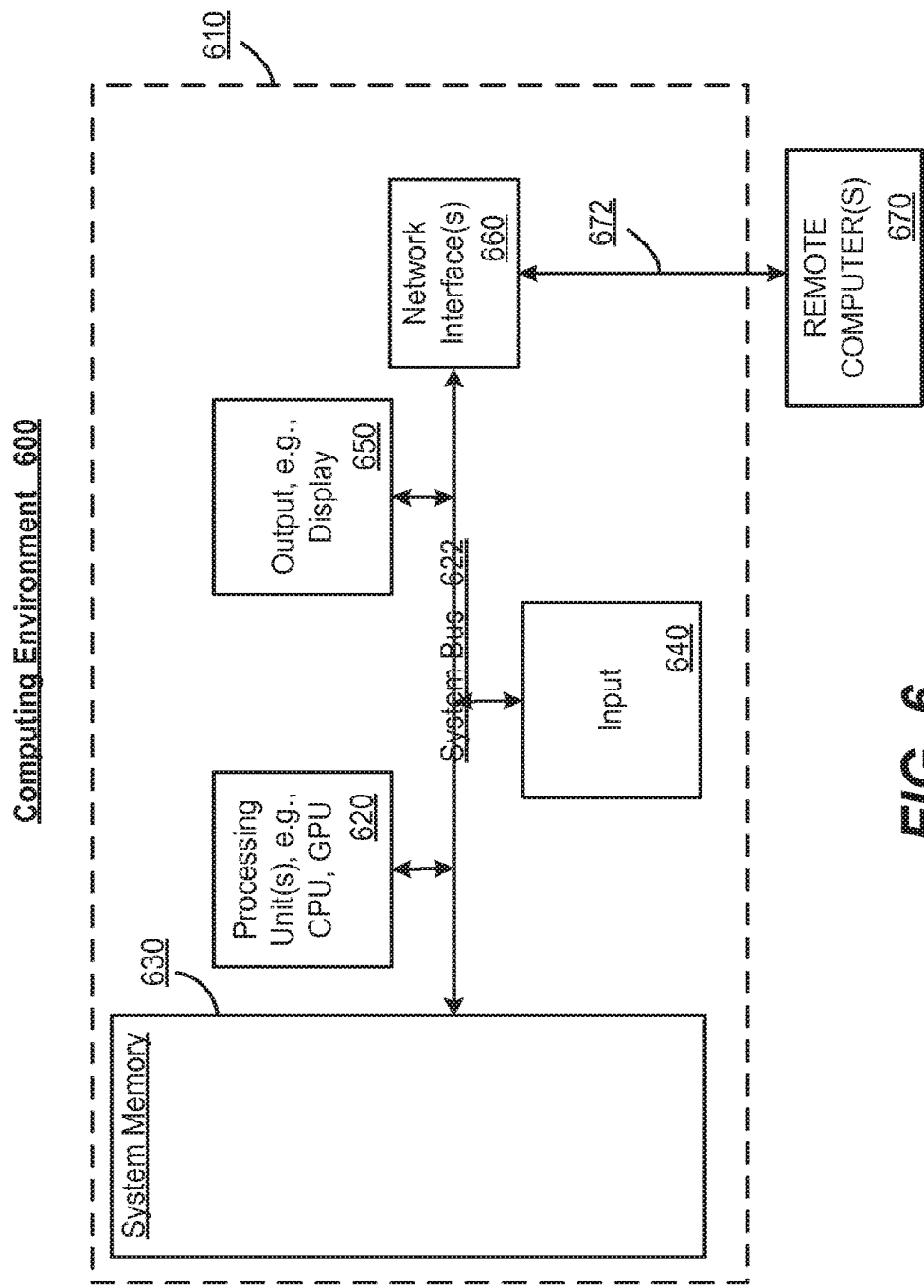
FIG. 6 is a block diagram representing an example computing environment into which aspects of the subject matter described herein may be incorporated.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of machine/computer-readable media and can be any available media that can be accessed by computer 610. The system memory 630 may include computer storage media in the form of volatile and/or nonvolatile memory such as read only memory (ROM) and/or random access memory (RAM), and hard drive media, optical storage media, flash media, and so forth. By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:

in response to detecting presentation of a video in a trickplay mode, selecting, by a client device, a trickplay image to display, from a set of trickplay images associated with the video, wherein the selecting the trickplay image is based upon a fast forward rate or a rewind rate of the presentation of the video, and further comprises, in response to a determination that a first resolution of the trickplay image is estimated as not being able to be downloaded in a defined amount of time, selecting a second resolution of the trickplay image that is a lower resolution than the first resolution and is estimated as being able to be downloaded within the defined amount of time, and selecting a next trickplay image of the set of images;

transmitting, by the client device during the defined amount of time, a first request to a remote device to download the trickplay image;

receiving, by the client device from the remote device during the defined amount of time, the trickplay image;

in response to the determination that the first resolution of the trickplay image is estimated as not being able to be downloaded in the defined amount of time:

transmitting, by the client device during a remaining time of the defined amount of time after receipt of the trickplay image, a second request to the remote device to download the next trickplay image at the first resolution, and receiving, by the client device from the remote device during the remaining time of the defined amount of time, at least a portion of the next trickplay image at the first resolution;

presenting, by the client device, the trickplay image during the trickplay mode;

in response to detecting user selection of exiting the presentation of the video in the trickplay mode, selecting, by the client device, a final trickplay image, from the set of trickplay images associated with the video, to display, wherein the selecting the final trickplay image is based upon a reaction time for the user selection of exiting the presentation of the video in the trickplay mode from a user viewing time of a presentation point of the video;

transmitting, by the client device, a third request to the remote device to download a final trickplay image;

receiving, by the client device from the remote device, the final trickplay image; and presenting, by the client device, the final trickplay image until a normal playback speed presentation of the video resumes.

2. The method of claim 1, further comprising:
selecting, by the client device during the trickplay mode and prior to the detecting user selection of exiting the presentation of the video in the trickplay mode, the next trickplay image, of the set of trickplay images associated with a video, to download based upon a current fast forward rate or a current rewind rate of the presentation of the video.

3. The method of claim 2, further comprising:
transmitting, by the client device, the second request to the remote device to download the next trickplay image;
receiving, by the client device from the remote device, the next trickplay image; and
presenting, by the client device, the next trickplay image.

4. The method of claim 2, wherein the selecting the next trickplay image comprises:
in response to detecting a change in the fast forward rate or the rewind rate:
selecting a quality of the next trickplay image based upon the change in the fast forward rate or the rewind rate;
transmitting, by the client device, the second request to the remote device to download the next trickplay image at the selected quality;
receiving, by the client device from the remote device, the next trickplay image at the selected quality; and
presenting, by the client device, the next trickplay image at the selected quality.

5. The method of claim 2, wherein the selecting the next trickplay image comprises:
in response to determining that a download time of the trickplay image meets a criterion, selecting a quality of the next trickplay image that is higher than a quality of the trickplay image; or
in response to determining that a download time of the trickplay image does not meets the criterion, selecting the quality of the next trickplay image that is lower than the quality of the trickplay image.

6. The method of claim 2, wherein the trickplay image has a different resolution from the next trickplay image.

7. The method of claim 1, wherein the trickplay image has a different resolution from the final trickplay image.

8. A device comprising:
a processor; and
a memory communicatively coupled to the processor, the memory having stored therein a trickplay logic component configured to:
in response to a first detection of a presentation of a video in a trickplay mode, select a trickplay image to display, from a set of trickplay images associated with the video, wherein the selection of the trickplay image is based upon a fast forward rate or a rewind rate of the presentation of the video, and further comprises, in response to a determination that a first resolution of the trickplay image is estimated as not being able to be downloaded in a defined amount of time, select a second resolution of the trickplay image that is a lower resolution than the first resolution and is estimated as being able to be downloaded within the defined amount of time, and select a next trickplay image of the set of images;
transmit a first request to a remote device to download the trickplay image;
receive, from the remote device, the trickplay image;
in response to the determination that the first resolution of the trickplay image is estimated as not being able to be downloaded in the defined amount of time:
transmit, during a remaining time of the defined amount of time after receipt of the trickplay image, a second request to the remote device to download the next trickplay image at the first resolution, and
receive, from the remote device during the remaining time of the defined amount of time, at least a portion of the next trickplay image at the first resolution;
present the trickplay image during the trickplay mode;
in response to a second detection of a user selection of exiting the presentation of the video in the trickplay mode, select a final trickplay image, from the set of trickplay images associated with the video, to display, wherein the selection of the final trickplay image is based upon an estimated reaction time for the user selection of exiting the presentation of the video in the trickplay mode from a user viewing time of a presentation point of the video;
transmit a third request to the remote device to download a final trickplay image;
receive, from the remote device, the final trickplay image; and
present the final trickplay image until a normal playback speed presentation of the video resumes.

9. The device of claim 8, wherein the trickplay logic component is further configured to select, during the trickplay mode and prior to the second detection of the user selection of exiting the presentation of the video in the trickplay mode, the next trickplay image, of the set of trickplay images associated with a video, to download based upon a current fast forward rate or a current rewind rate of the presentation of the video.

10. The device of claim 9, wherein the trickplay logic component is further configured to:
transmit the second request to the remote device to download the next trickplay image;
receive, from the remote device, the next trickplay image; and
present the next trickplay image.

11. The device of claim 9, wherein the selection of the next trickplay image comprises:
in response to a third detection of a change in the fast forward rate or the rewind rate:
select a quality of the next trickplay image based upon the change in the fast forward rate or the rewind rate;
transmit the second request to the remote device to download the next trickplay image at the selected quality;
receive, from the remote device, the next trickplay image at the selected quality; and
present the next trickplay image at the selected quality.

12. The device of claim 9, wherein the selection of the next trickplay image comprises:
in response to a first determination that a download time of the trickplay image meets a criterion, select a quality of the next trickplay image that is higher than a quality of the trickplay image; or
in response to a second determination that a download time of the trickplay image does not meets the criterion, select the quality of the next trickplay image that is lower than the quality of the trickplay image.

13. The device of claim 9, wherein the trickplay image has a different resolution from the next trickplay image.

14. The device of claim 8, wherein the trickplay image has a different resolution from the final trickplay image.

15. A method comprising:
- in response to detecting presentation of a video in a trickplay mode on a client device, selecting, by a server device comprising a processor, a trickplay image to display on the client device, from a set of trickplay images associated with the video, wherein the selecting the trickplay image is based upon a fast forward rate or a rewind rate of the presentation of the video, and further comprises, in response to a determination that a first resolution of the trickplay image is estimated as not being able to be downloaded in a defined amount of time, selecting a second resolution of the trickplay image that is a lower resolution than the first resolution and is estimated as being able to be downloaded within the defined amount of time, and selecting a next trickplay image of the set of images;
- transmitting, by the server device during the defined amount of time, the trickplay image to the client device;
- in response to the determination that the first resolution of the trickplay image is estimated as not being able to be downloaded in the defined amount of time, transmitting, by the server device during a remaining time of the defined amount of time after transmission of the trickplay image, at least a portion of the next trickplay image at the first resolution to the client device;
- in response to detecting user selection of exiting the presentation of the video in the trickplay mode on the client device, selecting, by the server device, a final trickplay image, from the set of trickplay images associated with the video, to display, wherein the selecting the final trickplay image is based upon a user reaction time for the user selection of exiting the presentation of the video in the trickplay mode from a user viewing time of a presentation point of the video; and
- transmitting, by the server device, the final trickplay image to the client device.

16. The method of claim 15, wherein the operations further comprising:
- selecting, by the server device during the trickplay mode and prior to the detecting the user selection of exiting the presentation of the video in the trickplay mode on the client device, the next trickplay image, of the set of trickplay images associated with a video, based upon a current fast forward rate or a current rewind rate of the presentation of the video.

17. The method of claim 16, wherein the operations further comprising:
- transmitting, by the server device, the next trickplay image to the client device.

18. The method of claim 16, wherein the selecting the next trickplay image comprises:
- in response to detecting a change in the fast forward rate or the rewind rate:
  - selecting, by the server device, a quality of the next trickplay image based upon the change in the fast forward rate or the rewind rate;
  - transmitting, by the server device, the next trickplay image at the selected quality to the client device.

19. The method of claim 16, wherein the selecting the next trickplay image comprises:
- in response to determining that a download time of the trickplay image meets a criterion, selecting a quality of the next trickplay image that is higher than a quality of the trickplay image; or
- in response to determining that a download time of the trickplay image does not meets the criterion, selecting the quality of the next trickplay image that is lower than the quality of the trickplay image.

20. The method of claim 15, wherein the trickplay image has a different resolution from the final trickplay image.

* * * * *